(12) United States Patent
Hansson et al.

(10) Patent No.: US 9,586,838 B2
(45) Date of Patent: Mar. 7, 2017

(54) LIGHT-EMITTING DIODE (LED)-BASED FLUID PURIFICATION SYSTEM

(71) Applicant: WATERSPRINT AB, Lund (SE)

(72) Inventors: Ola Hansson, Lund (SE); Kenneth M Persson, Lund (SE); Tord Wingren, Malmö (SE); Lars Montelius, Lund (SE)

(73) Assignee: WATERSPRINT AB (SE)

( * ) Notice: Subject to any disclaimer, the term of this patent is extended or adjusted under 35 U.S.C. 154(b) by 0 days.

(21) Appl. No.: 14/784,566

(22) PCT Filed: Apr. 15, 2014

(86) PCT No.: PCT/SE2014/050465
§ 371 (c)(1),
(2) Date: Oct. 14, 2015

(87) PCT Pub. No.: WO2014/171886
PCT Pub. Date: Oct. 23, 2014

(65) Prior Publication Data
US 2016/0075568 A1    Mar. 17, 2016

(30) Foreign Application Priority Data

Apr. 15, 2013 (SE) ...................................... 1350473

(51) Int. Cl.
*C02F 1/32* (2006.01)
*C02F 1/72* (2006.01)
*F24F 3/16* (2006.01)

(52) U.S. Cl.
CPC .............. *C02F 1/325* (2013.01); *C02F 1/725* (2013.01); *C02F 2201/326* (2013.01);
(Continued)

(58) Field of Classification Search
CPC ................................................. F24F 2003/667
See application file for complete search history.

(56) References Cited

U.S. PATENT DOCUMENTS

2003/0170151 A1    9/2003 Hunter et al.
2005/0183996 A1    8/2005 Zemel et al.
(Continued)

FOREIGN PATENT DOCUMENTS

WO    02092138    11/2002
WO    03041745    5/2003
(Continued)

*Primary Examiner* — Kishor Mayekar
(74) *Attorney, Agent, or Firm* — Ware, Fressola, Maguire & Barber LLP (57) ABSTRACT

Invention regards a light-emitting diode (LED)-based system for purifying a fluid flowing through a pipe, said system comprising means for mounting the system on the pipe, a housing, a pliant carrier structure comprising a plurality of LEDs arranged flush with a first surface (7) of the structure (8) and configured to emit radiation in UV range, wherein, when the system is pipe-mounted, said structure is detachably arranged within the housing, and said structure (8) adopts a substantially tubular shape within the housing with said first surface delimiting a purifying chamber (9), wherein said purifying chamber is in fluid communication with the pipe so that the fluid flowing through the pipe passes, prior to being dispensed, through the purifying chamber where it is exposed to ultraviolet (UV) radiation of the energized LEDs.

13 Claims, 5 Drawing Sheets

(52) U.S. Cl.
CPC ......... *C02F 2201/3222* (2013.01); *C02F 2201/3227* (2013.01); *C02F 2201/3228* (2013.01); *C02F 2209/11* (2013.01); *C02F 2209/40* (2013.01); *C02F 2301/024* (2013.01); *C02F 2303/04* (2013.01); *C02F 2305/10* (2013.01); *C02F 2307/06* (2013.01); *F24F 2003/1667* (2013.01)

(56) References Cited

U.S. PATENT DOCUMENTS

| | | |
|---|---|---|
| 2006/0131246 A1 | 6/2006 | Ehlers, Sr. |
| 2007/0181508 A1 | 8/2007 | Gui et al. |
| 2012/0138545 A1 | 6/2012 | Soler et al. |

FOREIGN PATENT DOCUMENTS

| | | |
|---|---|---|
| WO | 2008156813 | 12/2008 |
| WO | 2009013507 | 1/2009 |
| WO | 2012040757 | 4/2012 |

LIGHT-EMITTING DIODE (LED)-BASED FLUID PURIFICATION SYSTEM

TECHNICAL FIELD

The disclosure relates to a LED-based system for purifying a fluid flowing through a pipe.

BACKGROUND

Decontamination by means of ultra violet (UV) light is a well-established and reliable technique for use in systems for purifying fluids, in particular systems suitable for providing potable water. These systems are efficient and perform satisfactorily without the use of chemicals. Traditionally, germicidal UV light is produced with mercury lamps. These lamps are effective, but are bulky, rather fragile, require significant maintenance and pose a disposal issue.

Cited drawbacks are at least alleviated by employing light emitting diodes (LEDs) as light sources in purification systems of the above kind. UV LEDs of these systems emit a conventional light cone with an intensity pattern that approximates a Gaussian curve. Systems having LEDs of this kind are employed to attack the DNA of micro-organisms that contaminate the fluid, typically water, whereby the emitted UV-radiation destroys their genetic information and eliminates their reproductive capability thus making them harmless.

In this context and as is known in the art, the morphology and the aggregation properties of the different species of microorganisms vary greatly. Accordingly, *E. coli*-bacteria are rod-shaped and gather in a relatively large, irregularly-shaped clusters. Staphylococci, on the other hand, are substantially spherical and aggregate in grape-like clusters while Streptococci normally group in pairs or in chains. Spiral-shaped bacteria are also known. Moreover, clusters of bacteria present in the running fluid are randomly oriented in the fluid. In addition, each bacteria species has its DNA-string in a specific place in the cell—this is at least partially conditioned by the shape of the particular species. A light-emitting device, the purpose of which is to completely destroy the metabolic activity, mainly the DNA of the bacteria, or other microorganisms, needs to be designed with the above in mind.

US2012/0138545 discloses a system for fluid purification using UV LEDs. The system comprising at least one LED is preinstalled in a pipe or a faucet, i.e. the system is fixedly attached to the inner surface of the pipe/faucet at the factory. Given the apparent difficulties as regards the accessibility of the system, the replacement of the system at hand is a very challenging task, requiring considerable time and effort. Moreover, placement of the diodes themselves, either within the fluid flow or radially protruding from the pipe wall, renders the individual diodes more sensitive to external circumstances. More specifically, elevated fluid flow in the pipe might induce wear in the platform that supports the diode(s) or downright break it. Also, turbidity-causing particles being carried by the fluid flowing in the pipe might soil the light emitting area of the exposed diode such that its functionality is lost.

An objective of the present invention is therefore to reduce at least some of the drawbacks associated with the current art.

SUMMARY

The above stated objective is achieved by means of an LED-based system for purifying of a running fluid flowing through a pipe. The system comprises means for mounting the system on the pipe, a housing, a pliant carrier structure comprising a plurality of LEDs arranged flush with a first surface of the structure and configured to emit radiation in UV range, wherein, when the system is pipe-mounted, said structure is detachably arranged within the housing, and said structure adopts a substantially tubular shape within the housing with said first surface delimiting a purifying chamber, wherein said purifying chamber is in fluid communication with the pipe so that the fluid flowing through the pipe passes, prior to being dispensed, through the purifying chamber where it is exposed to UV radiation of the energized LEDs.

The detachability of the carrier structure opens for significant improvements with respect to the availability of the system as a whole. More specifically, in case of failure of the LED-unit, the carrier structure is the only component that needs to be replaced. As the carrier structure is easily accessible, this may be done in a fast and simple manner.

Moreover and in connection with above, the pliant nature of said carrier structure enables it to adopt a suitable shape—typically it will be the same shape as the profile of the pipe onto which the system is mounted. The congruence of the two shapes makes it possible to eliminate, or at least significantly reduce, pressure losses in the pipe. A further benefit of the achieved significant reduction of the pressure loss in the pipe is that the substantially limitless number of LEDs may be employed. Basically, it is the available length of the fluid pipe that is a limiting factor in this respect. This also means that the total energy output from the set of LEDs may be very high. Consequently, a system capable of treating even extremely contaminated fluids as well as very high flow may be obtained.

Furthermore, the LEDs being arranged in the plane of the structure mean that they are not frontally exposed to the running fluid when the structure is tubularly arranged in the mounted system. Obviously, this prevents them from getting soiled and/or damaged by the particles carried by the fluid.

In a related context, by arranging the LEDs flush with the first surface, i.e. in the plane of the structure, imparts full control of the radiation process. More specifically, with an arrangement of this kind, there are no intermediaries between the light sources and the fluid to be treated.

Another advantage of the system is its suitability for retrofitting of the already installed fluid pipes, e.g. those being part of a conventional plumbing system. More specifically, only required steps are removal of a section of the existing pipe commensurate with the length of the system and subsequent mounting of the system onto two pipe ends. Obviously, the versatility of the system is hereby increased.

In an embodiment, a diffraction grating is provided on at least one of the LEDs. This gives the possibility to diffract the emitted light as a function of the grating properties, i.e. the light will propagate in more directions than just substantially perpendicularly to the walls of the pipe. Consequently, parts of the microorganisms, in particular the bacteria, that couldn't be exposed to UV-light in a conventional set-up, as the one described in the document belonging to the prior art, may now be reached by the diffracted UV-light. Clearly, the probability to expose the DNA-string for UV-light increases hereby. In addition, use of diffraction gratings opens for positive interference—an optical effect where the diffracted light from two light sources is superposed in certain points in space, i.e. the light intensity in the particular point is a sum of light intensities of each light source in that point. The general shape of the thereby obtained radiation pattern resembles a comb. This is useful in case of unusually large amounts of microorganisms and/or if the microorganisms at hand require higher dose of light than those normally treated by the system. An additional effect is that the diffraction pattern depends on the wavelength of the used UV-light. This presents opportunities to combine gratings with different properties with UV-LED emitting at different wavelengths. Hereby, a light emitting pattern and light intensity that are tailored for the situation at hand may be achieved. Conclusively, the efficiency as well as the usefulness of the system are increased by providing the diffraction grating on at least one of the LEDs.

Further advantages and features of embodiments will become apparent when reading the following detailed description in conjunction with the drawings.

BRIEF DESCRIPTION OF THE DRAWINGS

FIGS. 1a and 1c are schematical perspective views of the pipe-respectively faucet-mounted system according to embodiments of the present invention whereas FIG. 1b is sectional view of the pipe-mounted system of FIG. 1a.

DETAILED DESCRIPTION OF THE PREFERRED EMBODIMENTS

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

In the following, term pipe is to be construed as encompassing fluid guides of different types of cross-sections, e.g. circular, rectangular and polygonal. Analogously, thereto closely related term tubular is also to be construed as relating to tubes for fluid conveyance with different types of cross-sections. In the same context, term pipe-mounted system covers installation of the system on regular pipes with different diameters as well as on faucets. In this context, a typical, but certainly not exclusive, application of the system at hand is in conventional plumbing systems where it is used to make the water potable. However, the fluid to be purified can comprise any type of fluid, including a liquid or a gas.

Figures 1A, 1C:
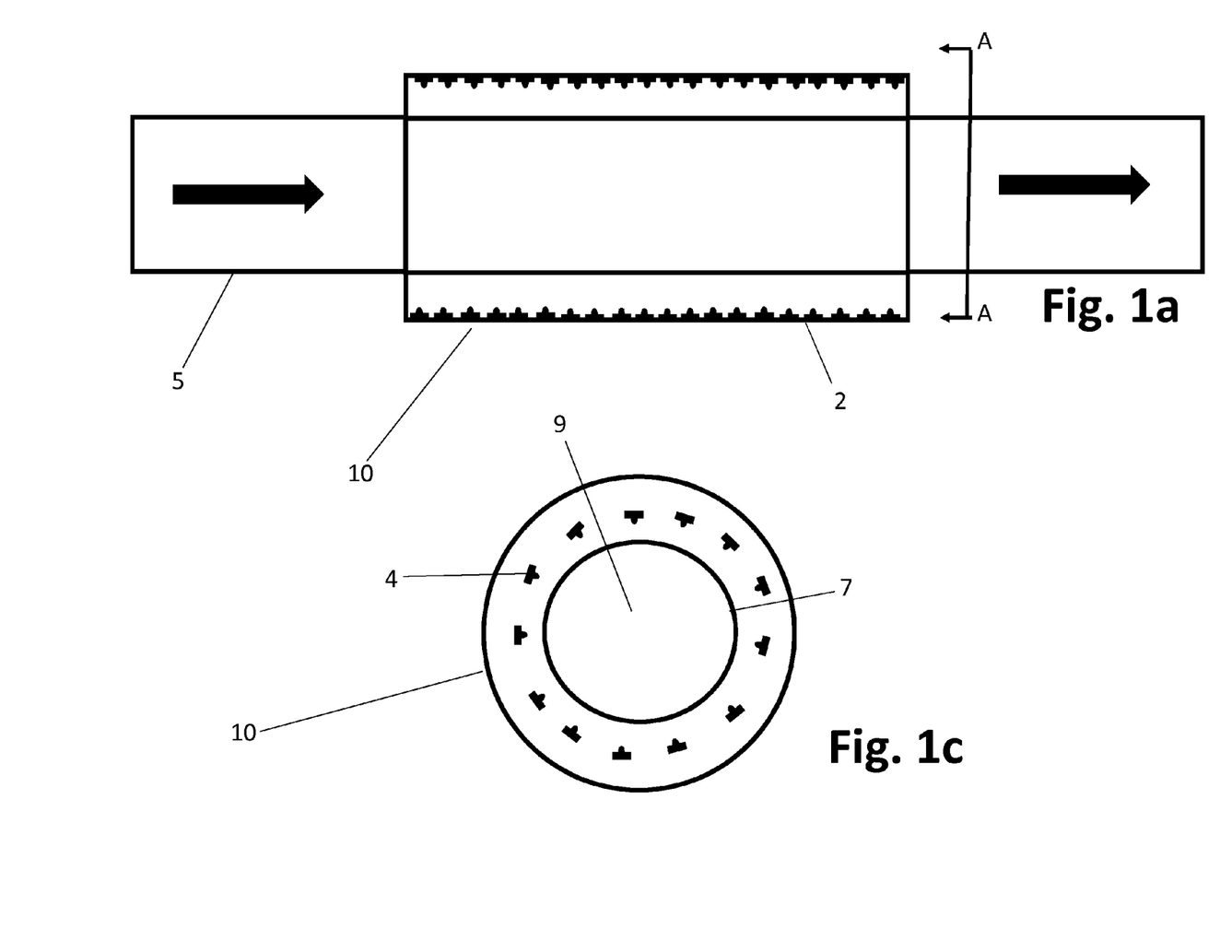
Figure 1B:
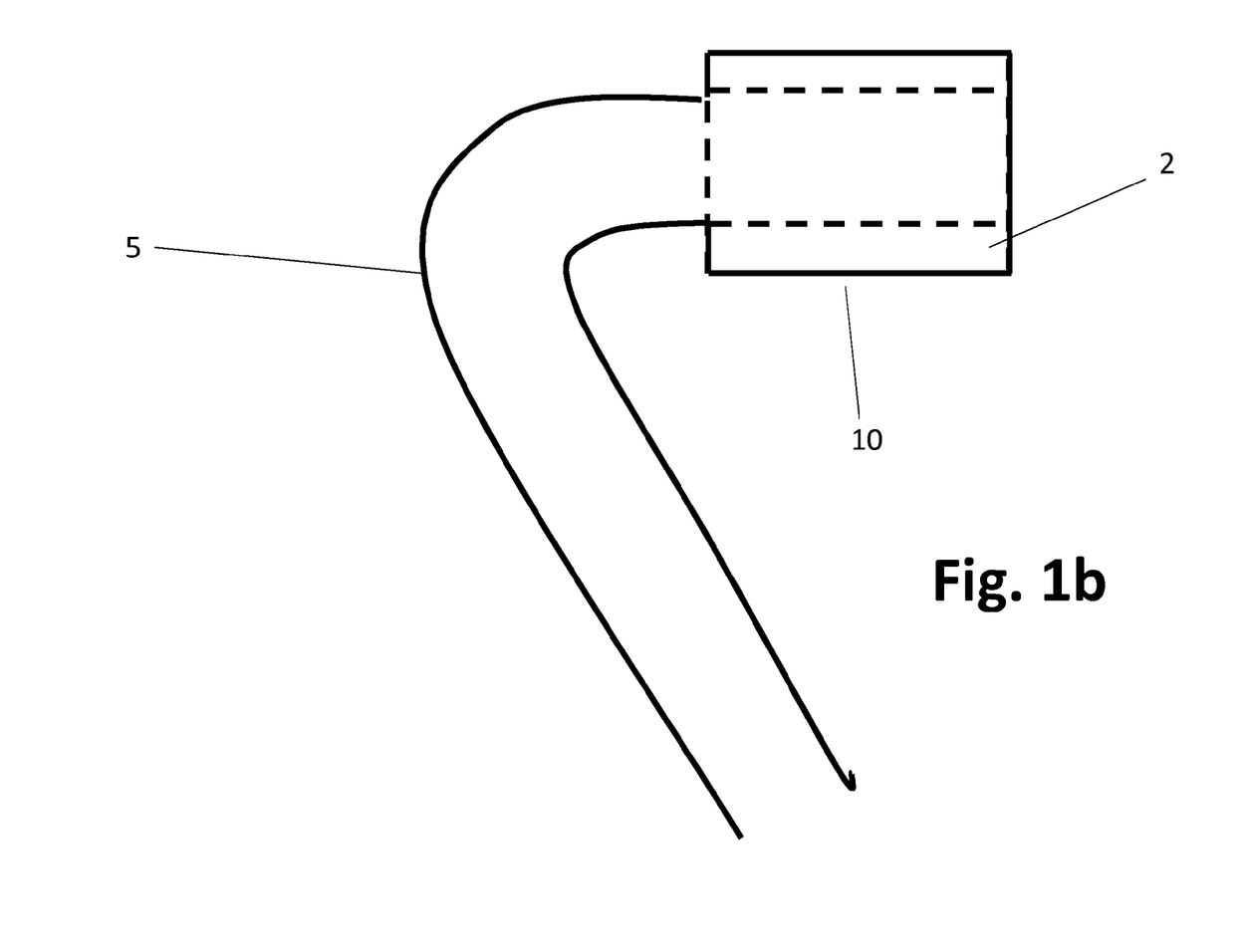

Turning now to figures, FIGS. 1a and 1c are schematical perspective views of the pipe-respectively faucet-mounted system 10 according to embodiments of the present invention whereas FIG. 1b is a sectional view of the pipe-mounted system 10 of FIG. 1a.

More specifically, FIG. 1a shows a system 10 for purifying a fluid flowing through a pipe 5 (fluid direction indicated with an arrow) when mounted on a pipe 5 of a conventional plumbing system 10. The system 10 is connected to the pipe 5 using means for mounting. These means may be realized in different ways. By way of example, a bayonet- or flange coupling may be used. As an alternative, the engagement may be achieved by complementary threaded portions of the system 10 and the pipe 5. If required, a suitable adapter could be installed onto the pipe 5 prior to mounting of the system 10.

More sensitive parts of the system 10 are protected by a substantially cylindrically-shaped housing 2. The housing 2 may be provided with a peripheral hinge (not shown) allowing dislocation of the upper half of the housing 2, thus enabling easy access to the inner components.

As regards the amount of radiation dosing, it is in a preferred embodiment predetermined based on several parameters and with a goal of achieving, in a fail-safe manner, adequate degree of purification. Most important of these parameters are fluid velocity, pipe dimension, microorganisms kill rate(s) and expected fluid turbidity. By way of example, for a pipe of a conventional household plumbing system (diameter between 5-10 mm) with a predictable contamination level, i.e. without sudden contamination peaks, the delivered dose of UV radiation shouldn't drop below 40 mJ/cm2.

As an alternative, a system may be provided with a flow rate sensor and/or turbidity sensor in order to accurately measure important process parameters. These measured values could subsequently be provided as input into drive mechanism of the LED with the purpose of suitably adapting the amount of radiation dosing delivered into the fluid.

In an embodiment (not shown), the system visually indicates, e.g. by means of a suitably positioned lamp, when the LEDs 4 of the pipe-mounted system emit radiation. With respect to the same embodiment, said visual indication might undergo a change, e.g. colour of the lamp could shift, when total energy output of the LEDs 4 drops below a predetermined value, i.e. when sufficient level of purification cannot be guaranteed.

Figure 5:
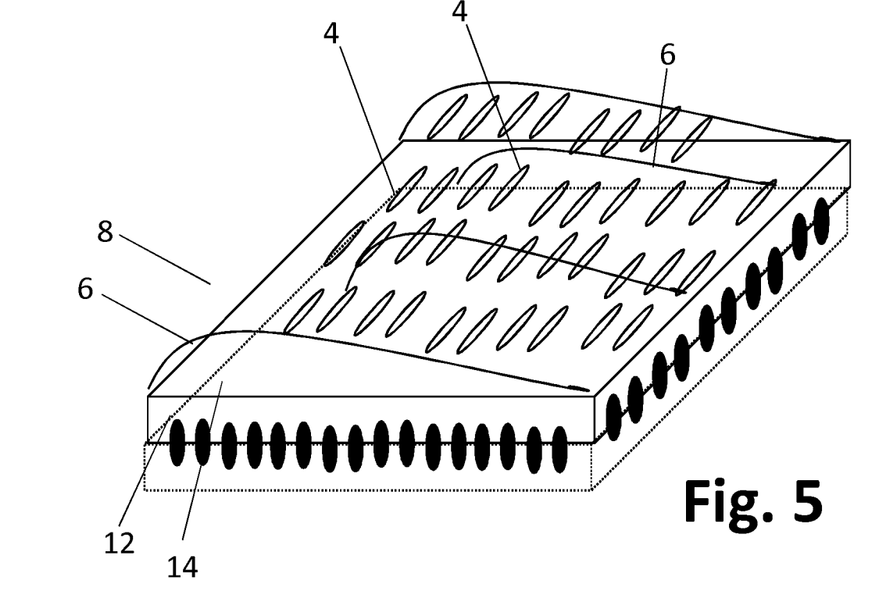
FIG. 5 is a schematical perspective side view of a layered pliant carrier structure with LEDs according to a further embodiment of the present invention.

FIG. 1b is a cross-sectional view of the pipe-mounted system 10 of FIG. 1a. A pliant carrier structure, described in more detail in connection with FIG. 5, is visible. It comprises a plurality of LEDs configured to emit radiation in UV range. Said structure is detachably arranged within a pipe-mounted housing 2 and it, as may be seen, adopts a substantially tubular shape within the housing 2. The detachability of the carrier structure opens for significant improvements with respect to the availability of the system 10 as a whole. More specifically, in case of failure of the LED-unit, the carrier structure is the only component that needs to be replaced. As the carrier structure is easily accessible, this may be done in a fast and simple manner. One way to releasably fixate the structure in appropriate position is to clamp it up between the pipe 5 and the housing 2. The interior of this tubular shape defines a purifying chamber 9. The purifying chamber 9 is in fluid communication with the pipe 5 so that the fluid flowing through the pipe 5, typically water, passes, prior to being dispensed for use or storage, through the purifying chamber 9.

FIG. 1c is a schematical perspective view of a system 10 for purifying a fluid flowing through a pipe 5 when mounted on a standard faucet.

Figure 2A:
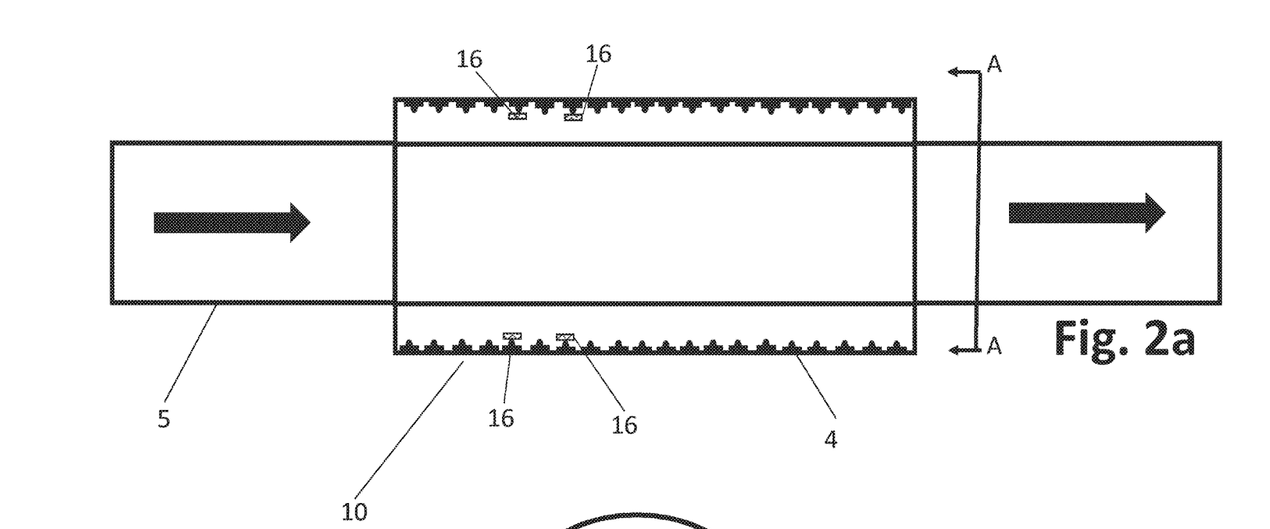
FIGS. 2a and 2b are two close-ups showing a purifying chamber, radial respectively axial cross-sectional view thereof, with LEDs according to one embodiment of the current invention when the system is pipe-mounted.
Figure 2B:
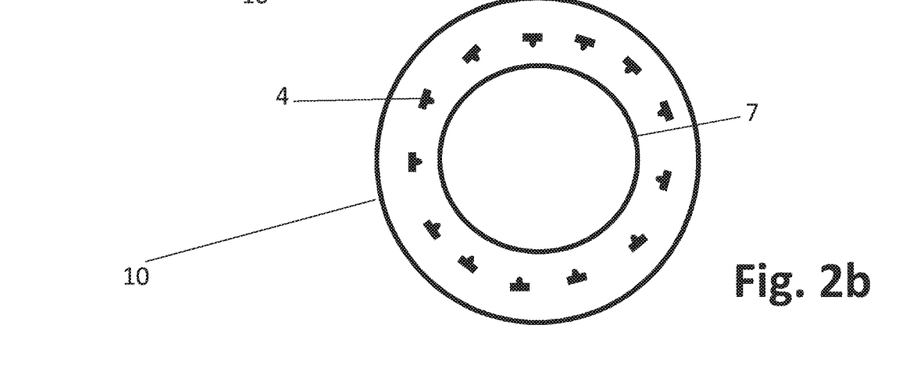

FIGS. 2a and 2b are two close-ups showing a purifying chamber, radial respectively axial cross-sectional view thereof, with LEDs 4 according to one embodiment of the current invention when the system 10 is pipe-mounted. Shown purifying chamber has a circular cross-section, but, as discussed above, other shapes are envisageable. In particular, non-circular cross-sections may provide more efficient internal reflection of the light. The pliant nature of said carrier structure enables it to adopt a suitable shape—typically it will be the same shape as the profile of the pipe 5 onto which the system 10 is mounted. The congruence of the two shapes makes it possible to eliminate, or at least significantly reduce, pressure losses in the pipe 5. For a substantially seamless connection, the inner dimensions of the purifying chamber match with the inner dimensions of the pipe 5. However, sometimes it could be desirable to dimension the purifying chamber so that its inner dimensions don't match those of the pipe 5. It is in the purifying chamber the fluid becomes exposed to UV radiation of the energized LEDs 4. In this context, as is known in the art, maximum germicidal effectiveness is achieved at wavelengths of approximately 260 nanometers. Obviously other wavelengths may be envisaged, mainly depending on the nature of the contamination. In order to further expand the field of use of the system 10, tuneable diodes, i.e. diodes emitting radiation of variable wavelength, may be employed. As a further way of increasing functionality of the system 10, a diffraction grating 16 (schematically shown in FIG. 2a) that splits and diffracts light into several beams travelling in different directions may be provided on at least one of the LEDs 4. As discussed above, the use of diffraction grating 16s increases the probability to expose the DNA-string for UV-light as well as opens for positive interference—useful in case of unusually large amounts of microorganisms and/or if the microorganisms at hand require higher dose of light than those normally treated by the system 10. Moreover, by combining gratings 6 with different properties with UV-LED emitting light at different wavelengths a tailored light emitting pattern and light intensity may be achieved. The system 10 is further provided with means for energizing (not shown) the LEDs 4. These means may be adapted to supply power from the electrical grid. As an alternative, in off-grid locations, these means may be embodied as photo-voltaic solar panels as well as fuel cell or battery units. As a further alternative, a micro turbine powered by the fluid flowing through the pipe 5 may be employed.

Figure 3:
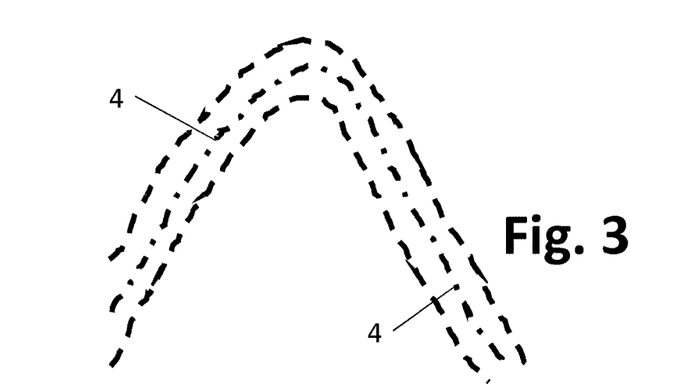
FIG. 3 is a top view of a pliant carrier structure where LEDs are arranged in a helical pattern.

FIG. 3 is a top view of a pliant carrier structure where LEDs 4 are arranged in a helical pattern. Hereby, it may be prevented that radiation originating from an individual LED 4 strikes directly onto the light emitting portion of another LED 4. In this way, length of life of the LEDs 4 may be significantly prolonged. Same effect is attained by arranging the LEDs 4 so that they extend only in the axial direction of the purifying chamber. Furthermore, the LEDs 4 being arranged in the plane of the structure mean that they are not frontally exposed to the running fluid when the structure is tubularly arranged in the mounted system. Obviously, this prevents them from getting soiled and/or damaged by the particles carried by the fluid. A further benefit is that the substantially limitless number of LEDs 4 may be employed. Basically, it is the available length of the fluid pipe that is a limiting factor in this respect. This also means that the total energy output from the set of LEDs 4 may be very high. Consequently, a system capable of treating even extremely contaminated fluids and/or very high flows may be obtained.

Figure 4:
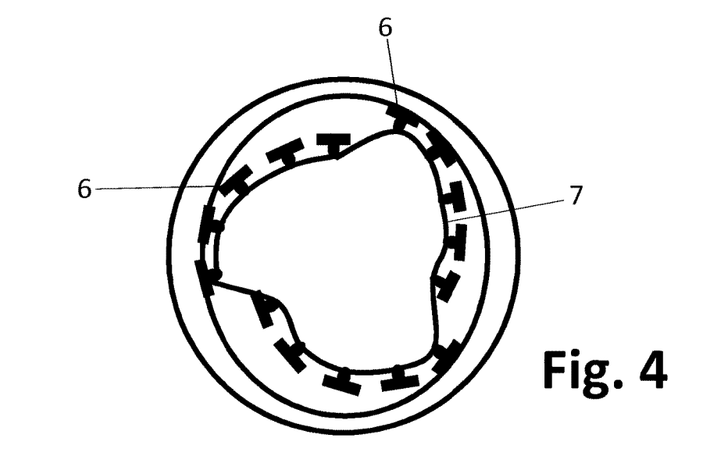
FIG. 4 shows a surface of a pliant carrier structure provided with turbulence creating means according to yet another embodiment of the present invention.

FIG. 4 shows a first, i.e. fluid-facing surface 7 of a pliant carrier structure when inserted into the pipe, said structure being provided with turbulence creating means 6 according to yet another embodiment of the present invention. Here, said turbulence creating means 6 are realized by providing the surface 7 with ridges that disturb the laminar fluid flow. As an alternative or complement, dedicated baffles (not shown) promoting turbulent flow may also be provided on said surface 7.

In the same context, said first surface 7 may be provided with a photoactivated coating. By way of example, this coated surface 7 may, when struck by light originating from LEDs, release free-radicals into the fluid flow. The released free radicals degrade bacteria present in the fluid. As an alternative, a coating could provide a surface with hydro-affinity. The coated surface is then rendered either hydrophobic or hydrophilic. Also, in order to further increase system efficiency, it is conceivable to coat at least a part of the fluid-facing surface of the pliant carrier structure with a highly light-reflective material.

In an embodiment, the system is configured to energize said plurality of LEDs in a pulsed mode. This allows the LEDs to be operated at a duty cycle (the pulse width at a certain frequency) of less than 100% thereby allowing the LEDs to be operated at a value exceeding their maximum rated power whilst simultaneously reducing the overall power consumed. The overall performance of the system is hereby improved. Moreover, the use of a pulsed signal also improves the treatment efficiency significantly, because the harmonics produced during the transition points of the pulsed signal provide additional UV frequencies, which contribute to destruction of the microorganisms.

FIG. 5 is a schematical perspective side view of a layered pliant carrier structure 8 with LEDs 4 according to a further embodiment of the present invention. Turbulence creating means 6 may also be seen. As discussed above, said flexible structure 8 is suitable to be detachably arranged within a housing for mounting on a fluid pipe. The pliant carrier structure 8 of FIG. 5, typically a few mm thick, comprises a first layer 12, made at least partly in a UV-radiation-transparent material and a second layer 14 comprising the plurality of LEDs 4, wherein the second layer 14 abuts the first layer 12 and the first layer 12 is arranged distal to the housing, once the structure 8 is arranged with the housing, relative to the second layer 14. This first layer 12 may be made in a polymer material such as polyethylene (PE) or polypropylene (PP), but it may also be made in a composite material. Regardless of the choice made, the chosen material needs to be UV-stable. The plurality of LEDs 4 of the second layer 14 is embedded in a material, typically a metal such as Al, acting as a heat sink. Conventional copper wires could be used to supply power to the individual LEDs 4 from the power source. In a variant, the pliant carrier structure might further comprise a third layer (not shown) that abuts the second layer, said third layer being arranged proximal to the housing relative to the second layer. This third layer may also be made in a polymer material (PE, PP) or in a composite material.

In another embodiment the structure comprises a first layer, made in UV-radiation-transparent material. Moreover, a plurality of LEDs configured to emit radiation in UV-range are associated with said layer of UV-radiation-transparent material such that radiation emitted by the LEDs passes through said section. Said LEDs are also arranged in a fluid-proof manner. The LEDs could be embedded in a material acting as a heat sink and absorbing heat that develops while LEDs are emitting radiation.

It is to be understood that the system and the carrier structure of the present invention are usable in other applications than those for treatment of contaminated water. By way of example, the system of the present invention may be employed in aircraft ventilation systems, preferably inserted in the air recirculation loop.

Regardless of the field of application, the system at hand is also suitable for retrofitting on the already installed fluid pipes. More specifically, only required steps are removal of a section of the existing pipe commensurate with the length of the system and subsequent mounting of the system onto two pipe ends. The versatility of the system is hereby significantly increased.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A system for purifying a fluid flowing through a pipe, said system comprising:
   means for mounting the system on the pipe,
   a housing, and
   a pliant carrier structure comprising a plurality of light emitting diodes (LEDs) arranged flush with a first surface of the structure and configured to emit ultraviolet (UV) radiation when energized,
wherein, said structure is detachably arranged within the housing, said structure adopts a substantially tubular shape within the housing with said first surface delimiting a purifying chamber, and a diffraction grating is provided on at least one of the LEDs, and
wherein said purifying chamber is, when the system is pipe mounted, in fluid communication with the pipe so that the fluid flowing through the pipe passes, prior to being dispensed, through the purifying chamber where it can be exposed to the emitted UV radiation of the energized LEDs.

2. The system of claim 1, wherein an array comprising said plurality of LEDs extends only in an axial direction of the purifying chamber.

3. The system of claim 1, wherein an array comprising said plurality of LEDs (4) extends in a helical pattern.

4. The system of claim 1, wherein at least a part of said first surface is provided with turbulence creating means.

5. The system of claim 1, wherein at least a part of said first surface is provided with a photoactivated coating.

6. The system of claim 1, wherein at least a part of said first surface is provided with a coating, said coated surface obtaining thereby a hydro-affinity.

7. The system of claim 1, wherein inner dimensions of the purifying chamber match with an inner dimension of the pipe.

8. The system of claim 1, wherein the pliant carrier structure further comprises:
   a first layer, made at least partly in a UV-radiation-transparent material,
   a second layer comprising the plurality of LEDs, wherein the second layer abuts the first layer and the first layer is arranged distal to the housing relative to the second layer.

9. The system of claim 8, wherein the plurality of LEDs of the second layer is embedded in a material acting as a heat sink.

10. The system of claim 8, wherein the pliant carrier structure further comprises a third layer that abuts the second layer, said third layer being arranged proximal to the housing relative to the second layer.

11. The system of claim 1, wherein a visual indication is provided when the LEDs of the pipe-mounted system emit radiation.

12. The system of claim 11, wherein said visual indication undergoes a change when total energy output of the LEDs drops below a predetermined value.

13. The system of claim 1, wherein said system is configured to energize said plurality of LEDs in a pulsed mode.

* * * * *